(12) United States Patent
Minezaki et al.

(10) Patent No.: US 9,234,986 B2
(45) Date of Patent: *Jan. 12, 2016

(54) POLYESTER RESIN AND OPTICAL LENS

(71) Applicant: MITSUBISHI GAS CHEMICAL COMPANY, INC., Tokyo (JP)

(72) Inventors: Takuya Minezaki, Kanagawa (JP); Takeshi Hirokane, Kanagawa (JP); Dai Oguro, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 177 days.

This patent is subject to a terminal disclaimer.

(21) Appl. No.: 14/166,142

(22) Filed: Jan. 28, 2014

(65) Prior Publication Data

US 2014/0142273 A1 May 22, 2014

Related U.S. Application Data

(62) Division of application No. 13/519,694, filed as application No. PCT/JP2010/073372 on Dec. 24, 2010, now Pat. No. 8,674,054.

(30) Foreign Application Priority Data

Jan. 7, 2010 (JP) ................................. 2010-002071

(51) Int. Cl.
*C08G 63/02* (2006.01)
*C08K 5/1575* (2006.01)
*G02B 1/04* (2006.01)
*C08G 63/181* (2006.01)
*C08G 63/672* (2006.01)

(52) U.S. Cl.
CPC .............. *G02B 1/041* (2013.01); *C08G 63/181* (2013.01); *C08G 63/672* (2013.01); *C08K 5/1575* (2013.01)

(58) Field of Classification Search
CPC ......... G02B 1/041; C08L 67/02; C08L 67/03; C08G 63/181; C08G 63/672; C08G 65/2609; C08G 83/003; C08K 5/1575
See application file for complete search history.

(56) References Cited

U.S. PATENT DOCUMENTS 8,233,225 B2  7/2012 Hirokane et al.
2012/0128984 A1  5/2012 Kawabata

FOREIGN PATENT DOCUMENTS

| JP | 2006-335974 | 12/2006 |
| WO | 2010/004965 | 1/2010 |
| WO | 2010/079809 | 7/2010 |
| WO | 2010/079810 | 7/2010 |

OTHER PUBLICATIONS

Robert M. Kriegel et al., "Thermal Transesterification of Bis (hydroxymethyl) propane-1, 3-diyl Units in Poly (ethylene terephthalate) and Poly (butylene terephthalate): A Route to Thermoset Polyesters", Macromolecules, 1998, vol. 31, No. 8, pp. 2475-2479.
Search report from International Patent Application No. PCT/JP2010/073372, mail date is Mar. 29, 2011.

*Primary Examiner* — Ling Choi
*Assistant Examiner* — Gennadiy Mesh
(74) *Attorney, Agent, or Firm* — Orgami & Bernstein, P.L.C.

(57) ABSTRACT

A polyester resin having a diol unit containing a unit derived from ethylene glycol and a unit derived from a diol represented by the following formula (I), and a dicarboxylic acid unit containing a unit derived from an aromatic dicarboxylic acid in an amount of 50 mol % or more; wherein the entire diol unit contains the unit derived from ethylene glycol in an amount of 40 to 99 mol %, and the unit derived from a diol represented by formula (I) in an amount of 1 to 60 mol %:

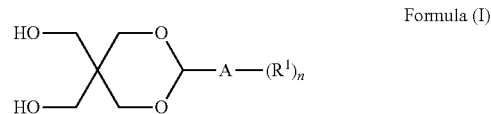

Formula (I)

wherein A represents an aromatic ring selected from the group consisting of benzene, naphthalene, anthracene, phenanthrene and pyrene; $R^1$ represents a C1 to C12 alkyl group, a substituted or unsubstituted C6 to C12 aryl group or a halogen atom; n represents an integer of 0 to 4; and when plural $R^1$ are present, $R^1$ may be the same as or different from each other.

12 Claims, No Drawings

POLYESTER RESIN AND OPTICAL LENS

CROSS REFERENCE TO RELATED APPLICATION

The present application is a divisional of pending U.S. patent application Ser. No. 13/519,694, which is a National Phase of PCT/JP2010/073372 filed Dec. 24, 2010 and claims the benefit of Japanese Application No. 2010-002071 filed Jan. 7, 2010. The disclosures of U.S. patent application Ser. No. 13/519,694 and PCT/JP2010/073372 are incorporated by reference herein their entireties.

TECHNICAL FIELD

The present invention relates to a polyester resin and to an optical lens. More particularly, the present invention relates to a polyester resin which is suitable for use as a material for an optical lens, and to an optical lens produced through molding of the resin.

BACKGROUND ART

Polyethylene terephthalate (PET) is a thermoplastic resin which is useful as a material for producing various molded products. Meanwhile, polyethylene naphthalate (PEN) exhibits excellent fundamental properties such as heat resistance, gas barrier property, and chemical resistance, as compared with PET. These thermoplastic polyester resins are widely used in a variety of applications including bottles, sheets and films.

However, PET or PEN exhibits high crystallinity and poses a problem in that it generates spherocrystal, which may cause turbidity or glare, during melting during the course of, for example, a molding process. Formation of a highly transparent product from PET or PEN is effectively carried out through a molding process in which crystallization is rapidly completed by performing crystallization during stretching without involving generation of spherocrystal. Thus, application of PET or PEN is limited to thin products such as bottles, films and sheets, which involve stretching when being formed; i.e., PET or PEN has not yet been widely applied to thick molded products.

As has been widely known, the crystallinity of a resin can be effectively lowered by copolymerizing or blending the resin with a third component. An amorphous polymer material can be applied to thick molded products without causing turbidity or glare, which would otherwise occur through crystallization. Therefore, in the case of production of a thermoplastic polyester resin, when the thermoplastic polyester resin is copolymerized with a monomer forming an amorphous polymer material, or when the resin is blended with an amorphous polymer material, the crystallinity of the resin can be lowered.

However, such a method poses a problem in that the glass transition temperature of the thermoplastic polyester resin is lowered through incorporation of an amorphous polymer material or a monomer thereof, and thus the heat resistance of the resin is impaired.

In general, in optical systems of various types of cameras such as a camera, a one-time-use camera and a video camera, aberration is corrected by using a plurality of concave lenses and convex lenses in combination. Specifically, chromatic aberration formed by a convex lens is corrected with chromatic aberration formed by a concave lens that is opposite that of the convex lens. In this case, the concave lens for aberration correction is required to exhibit high dispersion (i.e., low Abbe number). Optical glass or an optical transparent resin is employed as a material for an optical device used in the optical system of such a camera.

Optical glass exhibits excellent heat resistance, transparency, dimensional stability, chemical resistance and the like, and there are various optical glass materials having different refractive indexes and Abbe numbers. However, optical glass poses problems in terms of high material cost, poor moldability, and low productivity. Particularly, formation of an aspherical lens used for aberration correction requires a very sophisticated technique and high cost, which is a critical problem in practical use.

In contrast to the aforementioned optical glass, an optical transparent resin, in particular a thermoplastic transparent resin has advantages in that an optical lens can be mass-produced through injection molding of the resin, and also an aspherical lens can be readily produced from the resin. An optical lens produced from such a thermoplastic transparent resin is applied to a lens for a camera. Examples of the thermoplastic transparent resin include polycarbonate formed of bisphenol A, polymethyl methacrylate and amorphous polyolefin.

As for high dispersion (low Abbe number) of the aforementioned optical thermoplastic resins, polycarbonate formed of bisphenol A has a refractive index of about 1.59 and an Abbe number of about 32; polymethyl methacrylate has a refractive index of about 1.49 and an Abbe number of about 58; and amorphous polyolefin has a refractive index of about 1.54 and an Abbe number of about 56. Of these resins, only polycarbonate may be used as a material for producing a lens for aberration correction, but, because of its Abbe number of 32, cannot be considered to exhibit sufficiently high dispersion. Therefore, demand has arisen for a new material which can be used for producing a lens for aberration correction.

Patent Document 1 discloses a polyester resin produced through copolymerization of a fluorene dihydroxy compound, which resin has a refractive index of about 1.66 and an Abbe number of about 20, and can be used for forming a lens for aberration correction. The resin disclosed in Patent Document 1 has a low Abbe number and exhibits sufficiently high dispersion.

CITATION LIST

Patent Literature

[Patent Document 1] JP-A-2006-335974

SUMMARY OF INVENTION

Technical Problem

However, the resin disclosed in Patent Document 1 poses the following problems when used for producing an optical lens. Since the resin is formed through copolymerization of a large amount of a fluorene dihydroxy compound, which is bulky and rigid, the resin exhibits very high melt viscosity and thus poor moldability. In order to improve the moldability of the resin, the melt viscosity thereof during molding may be reduced by elevating the molding temperature or reducing the degree of polymerization. However, when the molding temperature is elevated, problems may arise in that coloration is likely to occur during molding, and a molding die is contaminated with generated thermal decomposition products. Meanwhile, when the degree of polymerization is reduced, the low-molecular-weight component content of the resin increases relatively, whereby the molding die is likely to be contaminated with low-molecular-weight components or decomposition products thereof.

Thus, there has not yet been disclosed an optical lens formed of a thermoplastic resin which exhibits excellent optical properties (high refractive index and low Abbe number) suitable for forming a lens for aberration correction, and which also exhibits practically sufficient moldability.

Also, there has not yet been disclosed a polyester material which exhibits low crystallinity and moldability satisfactory as a molding material, and which has a glass transition temperature approximately equal to that of PET or PEN alone; i.e., heat resistance comparable to that of PET or PEN alone.

The problem to be solved by the present invention is to provide a polyester resin which exhibits excellent moldability and heat resistance, and has low Abbe number and high refractive index.

Solution to Problem

The present invention provides a polyamide resin and an optical lens, as described below.

[1] A polyester resin comprising:
a diol unit, which contains a unit derived from ethylene glycol and a unit derived from a diol represented by the following formula (I), and
a dicarboxylic acid unit, which contains a unit derived from an aromatic dicarboxylic acid in an amount of 50 mol % or more;
wherein the entire diol unit contains the unit derived from ethylene glycol in an amount of 40 to 99 mol %, and the unit derived from a dial represented by formula (I) in an amount of 1 to 60 mol %:

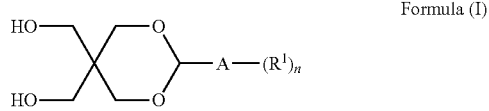

Formula (I)

wherein A represents an aromatic ring selected from the group consisting of benzene, naphthalene, anthracene, phenanthrene and pyrene; $R^1$ represents an alkyl group having to 12 carbon atoms, a substituted or unsubstituted aryl group having 6 to 12 carbon atoms or a halogen atom; n represents an integer of 0 to 4; and when plural $R^1$s are present, $R^1$s may be the same as or different from each other.

[2] An optical lens produced through molding of the polyester resin according to [1] above.

Advantageous Effects of Invention

The polyester resin of the present invention exhibits low crystallinity and can be formed into a transparent molded product without becoming turbid during molding. The polyester resin has a glass transition temperature approximately equal to that of PET or PEN alone; i.e., heat resistance comparable to that of PET or PEN alone. In addition, the polyester resin exhibits excellent moldability and is injection moldable. Also, the polyester resin exhibits high productivity and can be produced at low cost. The polyester resin of the present invention has low Abbe number and high refractive index, and is suitable for use as a material for producing a lens for aberration correction.

DESCRIPTION OF EMBODIMENTS

[Polyester Resin]
The polyester resin of the present invention comprises a diol unit, which contains a unit derived from ethylene glycol and a unit derived from a diol represented by the following formula (I), and a dicarboxylic acid unit, which contains a unit derived from an aromatic dicarboxylic acid in an amount of 50 mol % or more:

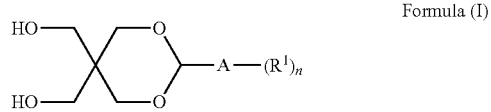

Formula (I)

wherein A represents an aromatic ring selected from the group consisting of benzene, naphthalene, anthracene, phenanthrene and pyrene; $R^1$ represents an alkyl group having 1 to 12 carbon atoms, a substituted or unsubstituted aryl group having 6 to 12 carbon atoms or a halogen atom; n represents an integer of 0 to 4; and when plural $R^1$s are present, $R^1$s may be the same as or different from each other.

(Diol Unit)

The diol unit of the polyester resin of the present invention contains a unit derived from ethylene glycol and a unit derived from a diol represented by formula (I); and the entire diol unit contains the unit derived from ethylene glycol in an amount of 40 to 99 mol %, and the unit derived from a dial represented by formula (I) in an amount of 1 to 60 mol %. When the amount of the unit derived from ethylene glycol falls within the aforementioned range, the polyester resin of the present invention exhibits favorable heat resistance and optical performance. When the amount of the unit derived from a diol represented by formula (I) falls within the aforementioned range, the polyester resin of the present invention exhibits low crystallinity and can be suitably employed for producing an optical lens.

In order to improve the heat resistance and optical performance of the polyester resin, and to reduce the crystallinity thereof, the amount of the unit derived from ethylene glycol is preferably 70 to 99 mol %, more preferably 80 to 90 mol %, further preferably 85 to 90 mol %, on the basis of the entirety of the diol unit, and the amount of the unit derived from a diol represented by formula (I) is preferably 1 to 30 mol %, more preferably 10 to 20 mol %, further preferably 10 to 15 mol %, on the basis of the entirety of the diol unit.

Now will be described the diol represented by formula (I).
In formula (I), A represents an aromatic ring selected from the group consisting of benzene, naphthalene, anthracene, phenanthrene and pyrene.

In formula (I), $R^1$ represents an alkyl group having 1 to 12 carbon atoms, a substituted or unsubstituted aryl group having 6 to 10 carbon atoms or a halogen atom.

In the present invention, the alkyl group is a linear, branched or cyclic alkyl group having 1 to 12 carbon atoms, preferably 1 to 9 carbon atoms, more preferably 1 to 4 carbon atoms. Specific examples of the alkyl group include methyl, ethyl, propyl, isopropyl, butyl, isobutyl, t-butyl, cyclohexyl and propylcyclohexyl. In the present invention, the aryl group is a substituted or unsubstituted aryl group having 6 to 10 carbon atoms, preferably 6 to 8 carbon atoms. Specific examples of the aryl group include phenyl, iodophenyl, dihydroxyphenyl, methoxyhydroxyphenyl and ethoxyhydroxyphenyl. Examples of the halogen atom include fluorine, chlorine, bromine and iodine. $R^1$ is preferably a methyl group, an isopropyl group, a cyclohexyl group, a phenyl group or a fluorine atom, and particularly preferably a phenyl group, from the viewpoint of the availability of a raw material.

In formula (I), n represents an integer from 0 to 4. When plural $R^1$s are present, $R^1$s may be the same as or different from each other. From the viewpoint of the availability of a raw material, n is preferably 0 or 1, more preferably 0.

The diol represented by formula (I) is preferably a diol represented by any of the following formulae (Ia) to (Ic). In the following formulae (Ia) to (Ic), $R^1$ and n have the same meanings as defined above in formula (I), and preferred ranges of $R^1$ and n are the same as those described above in formula (I).

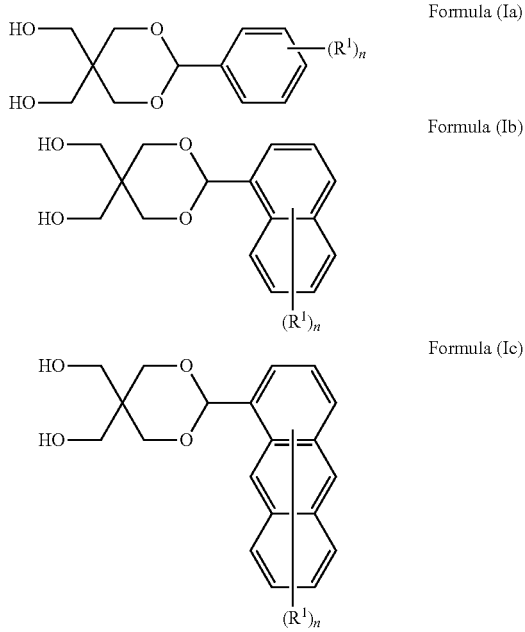

Specific examples of preferred diols represented by formula (I) include, but are not limited to, 5,5-dimethylol-2-phenyl-1,3-dioxane, 5,5-dimethylol-2-(2,4,6-trimethylphenyl)-1,3-dioxane, 5,5-dimethylol-2-(3,4-dimethylphenyl)-1,3-dioxane, 5,5-dimethylol-2-(4-cyclohexylphenyl)-1,3-dioxane, 5,5-dimethylol-2-(4-isopropylphenyl)-1,3-dioxane, 5,5-dimethylol-2-(4-fluorophenyl)-1,3-dioxane, 5,5-dimethylol-2-(4-biphenylyl)-1,3-dioxane, 5,5-dimethylol-2-(1-naphthyl)-1,3-dioxane, 5,5-dimethylol-2-(2-naphthyl)-1,3-dioxane and 5,5-dimethylol-2-(9-anthracenyl)-1,3-dioxane.

Of these, from the viewpoints of optical performance, heat resistance, and economy, preferred are 5,5-dimethylol-2-phenyl-1,3-dioxane, 5,5-dimethylol-2-(2,4,6-trimethylphenyl)-1,3-dioxane, 5,5-dimethylol-2-(4-biphenylyl)-1,3-dioxane and 5,5-dimethylol-2-(1-naphthyl)-1,3-dioxane, and more preferred are 5,5-dimethylol-2-(4-biphenylyl)-1,3-dioxane and 5,5-dimethylol-2-(1-naphthyl)-1,3-dioxane. These diols may be employed singly or in combination of two or more species.

No particular limitation is imposed on the method for producing the diol represented by formula (I), and the diol may be produced through reaction between pentaerythritol and an aromatic aldehyde represented by the following formula (A):

wherein A, $R^1$ and n have the same meanings as defined above in formula (I).

The polyester resin of the present invention may contain a diol unit in addition to the diol unit containing the unit derived from ethylene glycol and the unit derived from a diol represented by formula (I), so long as the effects of the invention are not impaired. Specific examples of the compound which may form such an additional diol unit include aliphatic diols such as trimethylene glycol, 2-methyl-1,3-propanediol, 1,4-butanediol, 1,5-pentanediol, 1,6-hexanediol, diethylene glycol, propylene glycol and neopentyl glycol; alicyclic diols such as 2,2,4,4-tetramethyl-1,3-cyclobutanediol, 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol and pentacyclododecanedimethanol; diols having a cyclic acetal skeleton such as 3,9-bis(1,1-dimethyl-2-hydroxyethyl)-2,4,8,10-tetraoxaspiro[5.5]undecane and 5-methylol-5-ethyl-2-(1,1-dimethyl-2-hydroxyethyl)-1,3-dioxane; and bisphenol compounds such as 4,4'-isopropylidenediphenol (bisphenol A) and methylenediphenol (bisphenol F). These diols may be employed singly or in combination of two or more species.

(Dicarboxylic Acid Unit)

The dicarboxylic acid unit of the polyester resin of the present invention contains a unit derived from an aromatic dicarboxylic acid in an amount of 50 mol % or more. When the amount of the unit derived from an aromatic dicarboxylic acid falls within the aforementioned range, the polyester resin of the present invention exhibits favorable heat resistance and optical performance.

In order to improve the heat resistance of the polyester resin, and to achieve high refractive index and low Abbe number thereof, the amount of the unit derived from an aromatic dicarboxylic acid is preferably 70 to 100 mol %, more preferably 85 to 100 mol %, further preferably 95 to 100%, particularly preferably 100 mol %, on the basis of the entirety of the dicarboxylic acid unit.

Specific examples of the aromatic dicarboxylic acid include, but are not limited to, terephthalic acid, isophthalic acid, phthalic acid, 2-methylterephthalic acid, naphthalenedicarboxylic acid, biphenyldicarboxylic acid and tetralindicarboxylic acid. Of these, naphthalenedicarboxylic acid is preferred, from the viewpoints of refractive index, Abbe number, heat resistance, and economy. Specific examples of the naphthalenedicarboxylic acid include 1,3-naphthalenedicarboxylic acid, 1,4-naphthalenedicarboxylic acid, 1,5-naphthalenedicarboxylic acid, 2,6-naphthalenedicarboxylic acid and 2,7-naphthalenedicarboxylic acid. Of these, 2,6-naphthalenedicarboxylic acid is particularly preferred. These aromatic dicarboxylic acids may be employed singly or in combination of two or more species.

Specific examples of the compound (other than the unit derived from an aromatic dicarboxylic acid) which may form the dicarboxylic acid unit include aliphatic dicarboxylic acids such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane and dimer acid. These compounds may be employed singly or in combination of two or more species.

(Additional Constitutive Unit)

For the purpose of adjusting melt viscoelasticity, molecular weight, etc., the polyester resin of the present invention may contain a monohydric alcohol unit such as butyl alcohol, hexyl alcohol or octyl alcohol; a tri- or more-valent polyhydric alcohol unit such as trimethylolpropane, glycerin, 1,3,5-pentanetriol or pentaerythritol; a monocarboxylic acid unit such as benzoic acid, propionic acid or butyric acid; a polycarboxylic acid unit such as trimellitic acid or pyromellitic acid; or an oxyacid unit such as glycolic acid, lactic acid, hydroxybutyric acid, 2-hydroxyisobutyric acid or hydroxybenzoic acid, so long as the effects of the invention are not impaired.

Since the polyester resin of the present invention is employed for producing an optical lens, in particular a concave lens for aberration correction, it is preferable that the entire diol unit contains the unit derived from ethylene glycol in an amount of 85 to 90 mol % and the unit derived from a diol represented by formula (I) in an amount of 10 to 15 mol %, and that the entire dicarboxylic acid unit contains only a unit derived from 2,6-naphthalenedicarboxylic acid. The polyester resin of the present invention having such a composition is well balanced in moldability, low crystallinity, high heat resistance, high refractive index and low Abbe number.

(Production Method for Polyester Resin)

No particular limitation is imposed on the method for producing the polyester resin of the present invention, and the polyester resin may be produced through any known method. Specific examples of the method for producing the polyester resin include melt polymerization methods such as transesterification and direct esterification; and solution polymerization methods. Transesterification is particularly preferred.

Production of the polyester resin may employ, for example, a catalyst such as a transesterification catalyst, an esterification catalyst or a polycondensation catalyst; a stabilizer such as an etherification preventing agent, a thermal stabilizer or a light stabilizer; or a polymerization controlling agent. These may be appropriately selected depending on, for example, reaction rate or the color tone, safety, thermal stability, weather resistance or elution property of the polyester resin.

Specific examples of the catalyst include compounds (e.g., a fatty acid salt, a carbonic acid salt, a phosphoric acid salt, a hydroxide, a chloride, an oxide, and an alkoxide) of metals such as zinc, lead, cerium, cadmium, manganese, cobalt, lithium, sodium, potassium, calcium, nickel, magnesium, vanadium, aluminum, titanium, antimony and tin; and metallic magnesium. These may be employed singly or in combination of two or more species. The transesterification catalyst employed for transesterification is preferably a manganese compound; specifically, for example, manganese acetate tetrahydrate. The polycondensation catalyst is preferably an antimony compound; specifically, for example, antimony oxide (III).

The amount of the transesterification catalyst employed for transesterification is preferably 0.001 to 1 mol %, more preferably 0.005 to 0.5 mol %, with respect to the dicarboxylic acid unit. The polycondensation catalyst employed is preferably 0.001 to 1 mol %, more preferably 0.005 to 0.5 mol %, with respect to the dicarboxylic acid unit.

The amount of foreign matter contained in the polyester resin of the present invention is preferably reduced to a minimum possible level, in order to improve the quality of the resin as a product. Therefore, when the polyester resin of the present invention is produced, preferably, there are carried out filtration of molten raw materials, filtration of a catalyst liquid, and filtration of a molten oligomer. The filter employed for filtration of molten raw materials, a catalyst liquid, or a molten oligomer preferably has a mesh size of 5 μm or less, more preferably 1 μm or less. Also, the polyester resin produced through polymerization is preferably filtered with a polymer filter. The polymer filter employed preferably has a mesh size of 100 μm or less, more preferably 30 μm or less. The process for producing resin pellets is desirably carried out in a low-dust environment, preferably in a class 1000 or lower clean room, more preferably in a class 100 or lower clean room.

(Polyester Resin Composition)

Optionally, an additive or a molding aid may be added to the polyester resin of the present invention, to thereby prepare a polyester resin composition. Examples of the additive and the molding aid include an antioxidant, a light stabilizer, a UV absorbent, a plasticizer, an extender, a matting agent, a drying controlling agent, an antistatic agent, a precipitation preventing agent, a surfactant, a flow-improving agent, a drying oil, a wax, a filler, a colorant, a reinforcing agent, a surface smoothing agent, a leveling agent, a curing accelerator and a thickener. For the purpose of imparting various properties to the polyester resin of the present invention in consideration of the intended use thereof, the polyester resin may be blended with an additional resin, to thereby prepare a polyester resin composition. Examples of the additional resin include thermoplastic resins, such as polyester resin other than the polyester resin of the present invention.

For the purpose of improving moldability, preferably, a flow-improving agent is added to the polyester resin of the present invention. The flow-improving agent may be, for example, an ester of a polyfunctional alcohol and a fatty acid, and is preferably a stearic acid ester of glycerin. The flow-improving agent content of the polyester resin composition is preferably 5,000 ppm or less, more preferably 3,000 ppm or less, further preferably 1,000 ppm or less, particularly preferably 500 ppm or less, for preventing problems caused by failure in releasing the composition from a molding die.

(Properties of Polyester Resin)

The polyester resin of the present invention preferably exhibits the following properties (1) to (3):

(1) a midpoint glass transition temperature of 110° C. or higher as measured through the plastic transition temperature measuring method in accordance with JIS K7121;

(2) an intrinsic viscosity (IV) of 0.2 to 1.0 dL/g as measured at 25° C. by use of a solvent mixture of phenol and 1,1,2,2-tetrachloroethane (ratio by mass=6:4); and (3) a melt mass flow rate of 10 to 200 g/10 min as measured through the melt mass flow rate test method in accordance with JIS K7210 at a test temperature of 260° C. and a load of 2.16 kgf.

<Property (1): Glass Transition Temperature (Tg)>

As used herein, "glass transition temperature (Tg)" refers to a midpoint glass transition temperature ($T_{mg}$) as measured by means of a differential scanning calorimeter through the plastic transition temperature measuring method in accordance with JIS K7121.

The polyester resin of the present invention preferably has a glass transition temperature of 110° C. or higher, more preferably 115° C. or higher, further preferably 120° C. or higher. When the glass transition temperature falls within the aforementioned range, an optical lens produced through molding of the polyester resin of the present invention can be subjected to a surface treatment such as hard coating, which is preferred.

<Property (2): Intrinsic Viscosity (IV)>

The intrinsic viscosity (IV) of the polyester resin of the present invention is measured at 25° C. by use of a solvent mixture of phenol and 1,1,2,2-tetrachloroethane (ratio by mass=6:4). The intrinsic viscosity may be measured by means of, for example, an automatic capillary viscometer (trade name: SS-300-L1, product of Shibayama Scientific Co., Ltd.).

No particular limitation is imposed on the intrinsic viscosity of the polyester resin of the present invention. However, in order to improve the moldability and optical performance of the polyester resin, the intrinsic viscosity is preferably 0.3 to 1.2 dL/g, more preferably 0.4 to 1.0 dL/g, further preferably 0.5 to 0.8 dL/g.

Since the polyester resin of the present invention is applied to an optical lens, the intrinsic viscosity thereof is preferably 0.2 to 1.0 dL/g, more preferably 0.25 to 0.5 dL/g, further preferably 0.3 to 0.4 dL/g. When the intrinsic viscosity falls within this range, occurrence of birefringence can be prevented during molding; i.e., the polyester resin is well balanced in moldability and low birefringence.

<Property (3): Melt Mass Flow Rate (MFR)>

The melt mass flow rate (MFR) of the polyester resin of the present invention is measured through the melt mass flow rate test method in accordance with HS K7210 at a test temperature of 260° C. and a load of 2.16 kgf. The melt mass flow rate may be measured by means of, for example, a melt indexer (trade name: C-5059D, product of Toyo Seiki Seisaku-Sho, Ltd.).

No particular limitation is imposed on the melt viscosity of the polyester resin of the present invention. However, since the polyester resin is applied to an optical lens, the melt viscosity is preferably 10 to 200 g/10 min, more preferably 20 to 150 g/10 min, further preferably 30 to 120 g/10 min, particularly preferably 50 to 110 g/10 min. When the melt mass flow rate falls within this range, occurrence of birefringence can be prevented during molding, and progress of crystallization caused by heat can be prevented during molding; i.e., the polyester resin is well balanced in moldability, low crystallinity and low birefringence.

<Refractive Index and Abbe Number>

Since the polyester resin of the present invention is employed for producing an optical lens, in particular a concave lens for aberration correction, the refractive index of the polyester resin is preferably 1.59 or more, more preferably 1.61 or more, further preferably 1.63 or more. No particular limitation is imposed on the maximum refractive index, but the refractive index is preferably 1.66 or less, in view of balance of the refractive index with other properties.

Since the polyester resin of the present invention is employed for producing an optical lens, in particular a concave lens for aberration correction, the Abbe number of the polyester resin is preferably 20 or less, more preferably 19 or less. No particular limitation is imposed on the minimum Abbe number, but the Abbe number is preferably 17 or more, in view of balance of the Abbe number with other properties.

The refractive index and Abbe number of the polyester resin of the present invention are measured through the below-described method. Specifically, a right-angled isosceles triangular piece, which has a length of each of the two sides forming the right angle: 20 mm and a thickness of 3 mm, is formed through injection molding of the polyester resin, and the injection-molded piece is subjected to annealing in an oven for 10 hours at a temperature lower by about 20° C. than the aforementioned glass transition temperature of the resin, to thereby prepare a measurement sample. The refractive index and Abbe number of the measurement sample are measured at 25° C. The refractive index is measured at 589 nm (d line), and the Abbe number is calculated from refractive indexes measured at 656 nm (C line), 486 nm (F line), and d line. These values may be measured by means of, for example, an Abbe refractometer (trade name: NAR-4T, product of Atago Co., Ltd.).

(Application of Polyester Resin)

The polyester resin of the present invention can be employed for various applications. For example, the polyester resin can be employed for, for example, an injection-molded product and an extrusion-molded product; specifically, a sheet, a film, a pipe, a bottle, a foam product, a tackifier, an adhesive, a coating material, and the like. The sheet or the film may be formed of a single layer or a plurality of layers, and may be non-stretched or in a monoaxially or biaxially stretched state. Alternatively, the sheet or the film may be stacked on, for example, a steel plate. The bottle may be a direct blow bottle or an injection blow bottle, or may be produced through injection molding. The foam product may be in the form of foam beads or an extruded foam product.

Particularly, the polyester resin of the present invention can be suitably employed for applications requiring high heat resistance and water vapor barrier property, including products employed in automobiles, packaging materials for imports and exports, electronic materials such as a back sheet of solar cell, and food packaging materials which are subjected to retort treatment or heating with a microwave oven.

[Optical Lens]

The polyester resin of the present invention can be suitably employed particularly for producing an optical lens. The optical lens of the present invention can be produced through injection molding of the polyester resin of the present invention by means of an injection molding machine or an injection-compression molding machine. When the optical lens is produced from the polyester resin, in order to reduce incorporation of foreign matter to a minimum possible extent, molding is desirably carried out in a low-dust environment, preferably in a class 1000 or lower clean room, more preferably in a class 100 or lower clean room.

The optical lens of the present invention may be a spherical lens or an aspherical lens, but is preferably an aspherical lens. Since spherical aberration can be substantially nulled by means of a single aspherical lens; i.e., a plurality of spherical lenses are not required to be employed in combination for elimination of spherical aberration, the weight of the optical lens can be reduced, and production cost can be reduced. Among optical lenses, an aspherical lens is particularly useful as a lens for a camera. Such an aspherical lens preferably has an astigmatism of 0 to 15 m$\lambda$, more preferably 0 to 10 m$\lambda$.

The surface of the optical lens of the present invention may be optionally provided with, for example, an antireflection layer or a hardcoat layer. The antireflection layer may be formed of a single layer or a plurality of layers. The material of the antireflection layer may be an organic substance or an inorganic substance, but is preferably an inorganic substance. Specific examples of the inorganic substance include oxides and fluorides, such as silicon oxide, aluminum oxide, zirconium oxide, titanium oxide, cerium oxide, magnesium oxide and magnesium fluoride.

The optical lens of the present invention can be applied to various types of lenses, including a pick-up lens, an f-$\theta$ lens, and a spectacle lens. Since the optical lens of the present invention has high refractive index and low Abbe number, the optical lens can be suitably employed particularly as a lens for chromatic aberration correction. Specifically, the optical lens can be suitably employed as a lens of, for example, a single-lens reflex camera, a digital still camera, a video camera, a cellular phone with camera, a one-time-use camera, a telescope, binoculars, a microscope, and a projector.

The optical lens of the present invention may be a convex lens or a concave lens. When, for example, the optical lens of the present invention is a concave lens, an optical lens system with reduced chromatic aberration can be formed by combining the concave lens with a convex lens having a high Abbe number. The Abbe number of the convex lens employed in combination is preferably 40 to 60, more preferably 50 to 60.

EXAMPLES

The present invention will next be described in more detail by way of examples, which should not be construed as limiting the invention thereto.

Production Examples 1 and 2

Production of 5,5-dimethylol-2-(1-naphthyl)-1,3-dioxane and 5,5-dimethylol-2-(4-biphenylyl)-1,3-dioxane N,N-Dimethylacetamide, toluene, pentaerythritol, and p-toluenesulfonic acid dihydrate, in amount of each shown in Table 1, were added to a glass flask, and the resultant mixture was stirred at 100° C. Thereafter, a toluene solution of 1-naphthaldehyde or a toluene solution of biphenylaldehyde in an amount of shown in Table 1 was added dropwise to the flask, followed by temperature elevation to 145° C. A distillate containing water was separated, and reaction was allowed to proceed for three to five hours. After completion of reaction, water was added to the resultant reaction mixture, to thereby precipitate white crystals. Subsequently, filtration, and washing with water were carried out, followed by concentration, to thereby produce 5,5-dimethylol-2-(1-naphthyl)-1,3-dioxane or 5,5-dimethylol-2-(4-biphenylyl)-1,3-dioxane as white crystals.

TABLE 1

| Compound | (Unit) | Production Example 1 | Production Example 2 |
|---|---|---|---|
| N,N-Dimethylacetamide | mL | 2000 | 2000 |
| Toluene | mL | 700 | 700 |
| Pentaerythritol | g | 100 | 100 |
| p-Toluenesulfonic acid dihydrate | g | 20 | 20 |
| 1-Naphthaldehyde/toluene | g/mL | 127/700 | 0 |
| Biphenylaldehyde/toluene | g/mL | 0 | 134/700 |
| Produced solid | | NFP | MPBP |

NFP: 5,5-dimethylol-2-(1-naphthyl)-1,3-dioxane
MPBP: 5,5-dimethylol-2-(4-biphenylyl)-1,3-dioxane Examples 1 and 2

Production of Polyester Resin

Raw material monomers in types and amounts of shown in Table 2 were added to a glass flask equipped with a heater, a stirring blade, a partial condenser, a trap, a thermometer, and a nitrogen gas feed tube, and the resultant mixture was heated to 215° C. in a nitrogen atmosphere in the presence of manganese acetate tetrahydrate in an amount of 0.03 mol % with respect to the dicarboxylic acid component, to thereby allow transesterification reaction to proceed. After the reaction conversion of the dicarboxylic acid component had reached 90% or more, antimony oxide (III) and triethyl phosphate were added in amounts of 0.02 mol % and 0.06 mol %, respectively, on the basis of 100 mol % of the dicarboxylic acid component, and temperature elevation and pressure reduction were gradually carried out. Finally, polycondensation was carried out at 250 to 270° C. and 0.1 kPa or less. The reaction was completed when an appropriate melt viscosity was achieved, and the resultant polyester resin was recovered.

Comparative Examples 1 and 2

Production of Polyester Resin

Raw material monomers in types and amounts of shown in Table 2 were added to a polyester production apparatus equipped with a packing-type rectification column, a partial condenser, a total condenser, a cold trap, a stirrer, a heater, and a nitrogen gas feed tube, and the resultant mixture was heated to 215° C. in a nitrogen atmosphere in the presence of manganese acetate tetrahydrate in an amount of 0.03 mol % with respect to the dicarboxylic acid component, to thereby allow transesterification reaction to proceed. After the reaction conversion of the dicarboxylic acid component had reached 90% or more, antimony oxide (III) and triethyl phosphate were added in amounts of 0.02 mol % and 0.06 mol %, respectively, on the basis of 100 mol % of the dicarboxylic acid component, and temperature elevation and pressure reduction were gradually carried out. Finally, polycondensation was carried out at 250 to 270° C. and 0.1 kPa or less. The reaction was completed when an appropriate melt viscosity was achieved, and the resultant polyester resin was recovered.

TABLE 2

| | | Example 1 | Example 2 | Comparative Example 1 | Comparative Example 2 |
|---|---|---|---|---|---|
| Dicarboxylic acid component (mol) | Dimethyl 2,6-naphthalene-dicarboxylate | 0.949 | 0.940 | 218.5 | 0 |
| | Dimethyl terephthalate | 0 | 0 | 0 | 369.5 |
| Diol component (mol) | NFP | 0.095 | 0 | 0 | 0 |
| | MPBP | 0 | 0.094 | 0 | 0 |
| | Ethylene glycol | 1.613 | 1.597 | 393.3 | 591.2 |

NFP: 5,5-dimethylol-2-(1-naphthyl)-1,3-dioxane
MPBP: 5,5-dimethylol-2-(4-biphenylyl)-1,3-dioxane (Production of Optical Lens)

The thus-produced polyester resin was dried under vacuum for 10 hours at a temperature lower by 20° C. than the glass transition temperature of the resin, and then the resin was subjected to injection molding by means of an injection molding machine (trade name: SH50, product of Sumitomo Heavy Industries, Ltd.) at a cylinder temperature of 260° C. and a die temperature lower by 35° C. than the glass transition temperature of the resin, to thereby produce a biconvex lens having a diameter of 28 mm and curvature radius in both convex surfaces of 20 mm.

The compositions and properties of the polyester resins produced in the Examples and the Comparative Examples were determined through the below-described methods. Also, the lenses produced in the Examples and the Comparative Examples were evaluated through the below-described method. The results are shown in Table 3.

<Methods for Determining the Composition and Properties of Polyester Resin>

(1) Composition of Resin

The proportion of the diol unit and the dicarboxylic acid unit in each polyester resin was calculated through $^1$H-NMR measurement by means of an NMR apparatus (trade name: JNM-AL400, product of JEOL Ltd.) at 400 MHz. Deuterated chloroform was employed as a solvent.

(2) Glass Transition Temperature (Tg)

The glass transition temperature of each polyester resin was measured by means of a differential scanning colorimeter (trade name: DSC/TA-60WS, product of Shimadzu Corporation). Specifically, about 10 mg of the polyester resin was added to a non-sealed aluminum container, and heated to 280° C. at a temperature elevation rate of 20° C./min and melted under a stream of nitrogen gas (30 mL/min), followed by quenching, to thereby prepare a measurement sample. Measurement was carried out on the thus-prepared sample under the same conditions as described above, and the midpoint glass transition temperature was calculated in accordance with JIS K7121.

(3) Intrinsic Viscosity (IV)

The intrinsic viscosity of each polyester resin was measured at 25° C. by means of an automatic capillary viscometer (trade name: SS-300-L1, product of Shibayama Scientific Co., Ltd.). Specifically, 0.5 g of the polyester resin was heat-dissolved in 120 g of a solvent mixture of phenol and 1,1,2,2-tetrachloroethane (ratio by mass=6:4), followed by filtration and then cooling to 25° C., to thereby prepare a measurement sample.

(4) Refractive Index and Abbe Number

The refractive index and Abbe number of each polyester resin were measured at 25° C. by means of an Abbe refractometer (trade name: NAR-4T, product of Atago Co., Ltd.). Specifically, the polyester resin was dried under vacuum for 10 hours at a temperature lower by about 20° C. than the glass transition temperature of the resin, and then the resin was subjected to injection molding by means of an injection molding machine (trade name: SH50, product of Sumitomo Heavy Industries, Ltd.) at a cylinder temperature of 280° C. and a die temperature lower by 20 to 50° C. than the glass transition temperature of the resin, to thereby form a right-angled isosceles triangular piece having a length of each of the two sides forming the right angle of 20 mm and a thickness of 3 mm. The thus-molded piece was subjected to annealing in an oven for 10 hours at a temperature lower by about 20° C. than the glass transition temperature of the resin, to thereby prepare a measurement sample. The refractive index was measured at 589 nm (d line), and the Abbe number was calculated from refractive indexes measured at 656 nm (C line), 486 nm (F line) and d line.

(5) Melt Mass Flow Rate (MFR)

The melt mass flow rate of each polyester resin was measured by means of a melt indexer (trade name: C-5059D, product of Toyo Seiki Seisaku-Sho, Ltd.). Specifically, the melt mass flow rate was measured in accordance with JIS K7210 at a measurement temperature of 260° C. and a load of 2.16 kgf.

<Method for Evaluation of Optical Lens>

(6) Evaluation of Appearance

The appearance of each optical lens was visually observed, to thereby evaluate in terms of transparency and deformation such as sink or warpage.

TABLE 3

| | | Example 1 | Example 2 | Comparative Example 1 | Comparative Example 2 |
|---|---|---|---|---|---|
| Composition and properties of polyester resin | | | | | |
| Copolymerization proportions (mol %) | Dimethyl 2,6-naphthalene-dicarboxylate | 100 | 100 | 100 | 0 |
| | Dimethyl terephthalate | 0 | 0 | 0 | 100 |
| | NFP | 10 | 0 | 0 | 0 |
| | MPBP | 0 | 10 | 0 | 0 |
| | Ethylene glycol | 90 | 90 | 100 | 100 |
| Glass transition temperature (° C.) | | 125 | 115 | 124 | 84 |
| Intrinsic viscosity (dL/g) | | 0.32 | 0.28 | 0.55 | 0.72 |
| Refractive index | | 1.647 | 1.646 | 1.649 | 1.575 |
| Abbe number | | 18.6 | 18.7 | 65 | 39 |
| MFR (g/10 min) | | 116 | 178 | 4.8 | 5.3 |
| Evaluation of optical lens | | | | | |
| Transparency | | Good | Good | Turbid | Turbid |
| Deformation | | Absence | Absence | Presence | Presence |

NFP: 5,5-dimethylol-2-(1-naphthyl)-1,3-dioxane
MPBP: 5,5-dimethylol-2-(4-biphenylyl)-1,3-dioxane The polyester resin of Comparative Example 1 or 2 (PEN or PET), which did not contain a unit derived from a diol represented by formula (I), was found to exhibit high intrinsic viscosity, low melt mass flow rate, poor injection moldability, and high Abbe number. The optical lens produced through injection molding of the polyester resin of Comparative Example 1 or 2 exhibited high crystallinity and poor transparency (i.e., turbidity) and showed deformation by sink or warpage.

In contrast, the polyester resin of Example 1 or 2, which contained a diol unit derived from a diol represented by formula (I), was found to exhibit low intrinsic viscosity, high melt mass flow rate, excellent injection moldability, low Abbe number, and high refractive index. The polyester resin of Example 1 exhibited a glass transition temperature which was approximately equal to that of PEN alone (Comparative Example 1). Meanwhile, the polyester resin of Example 2 exhibited a glass transition temperature which was slightly lower than that of PEN alone (Comparative Example 1), but was considerably higher than that of PET alone (Comparative Example 2). That is, the polyester resins of Examples 1 and 2 exhibited excellent heat resistance. Hitherto, when attempts are made to improve the crystallinity of PET or PEN, problems may arise in that the glass transition temperature thereof is lowered, and thus the heat resistance thereof is impaired. In contrast, the polyester resin of the present invention exhibits low crystallinity and moldability satisfactory as a molding material, and has a glass transition temperature approximately equal to that of PET or PEN alone; i.e., heat resistance comparable to that of PET or PEN alone.

The optical lens produced through injection molding of the polyester resin of Example 1 or 2 exhibited excellent transparency, excellent moldability, no deformation, low Abbe number, and high refractive index. Therefore, the optical lens exhibited excellent properties as a lens for aberration correction.

INDUSTRIAL APPLICABILITY

The polyester resin of the present invention is suitable for use as a material for an optical lens of, for example, a camera, a telescope, binoculars, or a television projector. The polyester resin is very useful, since an aspherical lens of high refractive index and low birefringence (such a lens is technically difficult to produce from glass) can be effectively produced through injection molding of the polyester resin at low cost. Particularly, the polyester resin of the present invention can be suitably employed for producing a lens for chromatic aberration correction.

What is claimed is:

1. A polyester resin comprising:
   a diol unit, which contains a unit derived from ethylene glycol and a unit derived from a diol represented by the following formula (I), and
   a dicarboxylic acid unit, which contains a unit derived from an aromatic dicarboxylic acid in an amount of 50 mol % or more;
   wherein the entire diol unit contains the unit derived from ethylene glycol in an amount of 40 to 99 mol %, and the unit derived from a diol represented by formula (I) in an amount of 1 to 60 mol %:

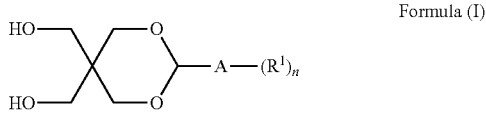

Formula (I)

wherein A represents benzene; $R^1$ represents an alkyl group having 1 to 12 carbon atoms, a substituted or unsubstituted aryl group having 6 to 12 carbon atoms or a halogen atom; n represents an integer of 1 to 4; and when plural $R^1$ are present, $R^1$ may be the same as or different from each other.

2. The polyester resin according to claim 1, wherein the aromatic dicarboxylic acid is a naphthalenedicarboxylic acid.

3. The polyester resin according to claim 2, wherein the naphthalenedicarboxylic acid is 2,6-naphthalenedicarboxylic acid.

4. The polyester resin according to claim 1, wherein the diol represented by formula (I) is at least one selected from the group consisting of 5,5-dimethylol-2-(2,4,6-trimethylphenyl)-1,3-dioxane, 5,5-dimethylol-2-(3,4-dimethylphenyl)-1,3-dioxane, 5,5-dimethylol-2-(4-cyclohexylphenyl)-1,3-dioxane, 5,5-dimethylol-2-(4-isopropylphenyl)-1,3-dioxane, 5,5-dimethylol-2-(4-fluorophenyl)-1,3-dioxane, and 5,5-dimethylol-2-(4-biphenylyl)-1,3-dioxane.

5. The polyester resin according to claim 4, wherein the diol represented by formula (I) is 5,5-dimethylol-2-(2,4,6-trimethylphenyl)-1,3-dioxane and/or 5,5-dimethylol-2-(4-biphenylyl)-1,3-dioxane.

6. The polyester resin according to claim 5, wherein the diol represented by formula (I) is 5,5-dimethylol-2-(4-biphenylyl)-1,3-dioxane.

7. The polyester resin according to claim 1, wherein the entire diol unit contains the unit derived from the diol represented by formula (I) in an amount of 1 to 30 mol %.

8. The polyester resin according to claim 1, which exhibits the following properties (1) to (3):
   (1) a midpoint glass transition temperature of 110° C. or higher as measured through the plastic transition temperature measuring method in accordance with JIS K7121;
   (2) an intrinsic viscosity (IV) of 0.2 to 1.0 dL/g as measured at 25° C. by use of a solvent mixture of phenol and 1,1,2,2-tetrachloroethane (ratio by mass=6:4); and
   (3) a melt mass flow rate of 10 to 200 g/10 min as measured through the melt mass flow rate test method in accordance with JIS K7210 at a test temperature of 260° C. and a load of 2.16 kgf.

9. An optical lens produced through molding of the polyester resin according to claim 1.

10. The optical lens according to claim 9, wherein when the polyester resin is injection-molded into a right-angled isosceles triangular test piece having a thickness of 3 mm in which the length of each of the two sides forming the right angle is 20 mm, and the test piece is subjected to annealing for 10 hours at a temperature lower by 20° C. than the glass transition temperature of the resin, the test piece exhibits an Abbe number of 20 or less.

11. The optical lens according to claim 9, which is a lens for a camera.

12. An optical lens system comprising the optical lens according to claim 9.

* * * * *